United States Patent
Morgan

(10) Patent No.: US 8,174,545 B2
(45) Date of Patent: May 8, 2012

(54) MITIGATION OF TEMPORAL PWM ARTIFACTS

(75) Inventor: Daniel J. Morgan, Denton, TX (US)

(73) Assignee: Texas Instruments Incorporated, Dallas, TX (US)

( * ) Notice: Subject to any disclaimer, the term of this patent is extended or adjusted under 35 U.S.C. 154(b) by 401 days.

(21) Appl. No.: 12/419,189

(22) Filed: Apr. 6, 2009

(65) Prior Publication Data

US 2010/0091040 A1   Apr. 15, 2010

Related U.S. Application Data

(63) Continuation of application No. 09/573,109, filed on May 17, 2000, now Pat. No. 7,515,161.

(60) Provisional application No. 60/134,418, filed on May 17, 1999.

(51) Int. Cl.
 G09G 5/10 (2006.01)
 G09G 5/02 (2006.01)
(52) U.S. Cl. .................. 345/691; 345/692; 345/693
(58) Field of Classification Search .............. 345/691, 345/692, 693
See application file for complete search history.

(56) References Cited

U.S. PATENT DOCUMENTS

| | | | |
|---|---|---|---|
| 5,293,159 A | 3/1994 | Bassetti et al. |
| 5,404,427 A | 4/1995 | Cawley et al. |
| 5,534,883 A | 7/1996 | Koh |
| 5,619,228 A | 4/1997 | Doherty |
| 6,064,366 A | 5/2000 | Millward et al. |
| 6,324,006 B1 | 11/2001 | Morgan |
| 6,388,661 B1 | 5/2002 | Richards |
| 7,403,213 B1 | 7/2008 | Morgan et al. |
| 7,515,161 B1 | 4/2009 | Morgan |

*Primary Examiner* — Kevin M Nguyen
(74) *Attorney, Agent, or Firm* — Warren L. Franz; Wade J. Brady III; Frederick J. Telecky, Jr.

(57) ABSTRACT

A system and method for reducing pulse width modulation contouring artifacts. Each input intensity value is translated to at least one non-binary bit pattern for display. Many of the input intensity values are translated to at least two alternate non-binary bit patterns. The alternate codes are used to smooth the transition between intensity codes as major bits are turned on. The smoothing occurs by the gradual transition from codes that do not use the major bit to codes that do use the major bit. Typically the alternate codes are selected based on the location of the pixel in a spatial pattern (100) and the alternate codes are spatially alternated from one pixel (102) to the next (104). Other embodiments temporally alternate the codes from one period—typically a frame period—to the next. Still other embodiments alternate the codes both spatially and temporally.

12 Claims, 3 Drawing Sheets

| | 102 | 104 | | |
|---|---|---|---|---|
| A | B | A | B | A |
| B | A | B | A | B |
| A | B | A | B | A |
| B | A | B | A | B |
| A | B | A | B | A |

*FIG. 1A*

| B | A | B | A | B |
|---|---|---|---|---|
| A | B | A | B | A |
| B | A | B | A | B |
| A | B | A | B | A |
| B | A | B | A | B |

*FIG. 1B*

| 36 | 36 | 36 | B | A |
|---|---|---|---|---|
| 36 | 36 | B | A | B |
| 36 | B | A | B | A |
| B | A | B | A | 34 |
| A | B | 34 | 34 | 34 |

*FIG. 2A*

| 36 | 36 | 36 | A | B |
|---|---|---|---|---|
| 36 | 36 | A | B | A |
| B | A | B | A | B |
| A | B | A | B | 34 |
| 34 | 34 | 34 | 34 | 34 |

*FIG. 2B*

| P1 | P2 | P3 | P4 | P5 |
|---|---|---|---|---|
| P6 | P7 | P8 | P9 | P10 |
| P11 | P12 | N | P13 | P14 |
| P15 | P16 | P17 | P18 | P19 |
| P20 | P21 | P22 | P23 | P24 |

*FIG. 3*

| A | B | A | B | A |
|---|---|---|---|---|
| A | A | A | A | A |
| B | A | B | A | B |
| A | A | A | A | A |
| A | B | A | B | A |

*FIG. 4A*

MITIGATION OF TEMPORAL PWM ARTIFACTS

CROSS-REFERENCE TO RELATED APPLICATIONS

This application is a continuation of application Ser. No. 09/573,109, filed May 17, 2000 (now U.S. Pat. No. 7,515,161), which claims the benefit of Provisional Application No. 60/134,418, filed May 17, 1999.

The following patents and/or commonly assigned patent applications are hereby incorporated herein by reference:

| Pat. No. | Filing Date | Issue Date | Title |
|---|---|---|---|
| 5,619,228 | Jun. 5, 1996 | Apr. 8, 1997 | Method For Reducing Temporal Artifacts In Digital Video |
| 09/088,674 | Jun. 2, 1998 | | Boundary Dispersion For Mitigating PWM Temporal Contouring Artifacts In Digital Displays |
| 60/174,106 | Dec. 31, 1999 | | Spoke Light Recapture In Sequential Color Imaging Systems |

FIELD OF THE INVENTION

This invention relates to the field of display systems, more particularly to digital display systems using pulse width modulation.

BACKGROUND OF THE INVENTION

Digital display systems typically produce or modulate light as a linear function of input image data for each pixel. For an 8-bit monochromatic image data word, the input image data word ranges from 0 to 255. A value of 0 results in no light being transmitted to or produced by a pixel, 255 is the maximum intensity level for a pixel, and 128 is mid-scale light.

Pulse width modulation (PWM) schemes typically modulate a constant intensity light source in periods whose length increases by a power of two. For example, when 5 mS is available for each color of a three-color system the element on times for one 8-bit system are 20 μS, 40 μS, 80 μS, 160 μS, 320 μS, 640 μS, 1280 μS, and 2560 μS. If a given bit for a particular pixel is a logic 0, no light is transmitted to or generated by the pixel. If the bit is a logic 1, then the maximum amount of light is transmitted to or generated by the pixel during the bit period. The viewer's eye integrates the light received by a particular pixel during an entire frame period to produce the perception of an intermediate intensity level.

One problem created by PWM schemes is the creation of visual artifacts that arise due to the generation of an image as a series of discrete bursts of light. While stationary viewers perceive stationary objects as having the correct intensity, motion of the viewer's eye or motion in the image can create an artifact know as PWM temporal contouring, or simply PWM contouring. PWM contouring is described in U.S. Pat. No. 5,619,228 and occurs when the distribution of radiant energy during a frame period changes from one frame to the next. With motion in the scene or eye, portions of the frame time of adjacent image pixels are integrated to achieve an incorrect perceived pixel intensity. The PWM temporal contouring artifact appears as a noticeable pulsation in the image pixels. This pulsation is time-varying and creates apparent contours in an image that do not exist in the input image data.

PWM contouring is most clearly seen when viewing a grayscale ramp that increases horizontally across an image. As the image data on each line increase from 0 on the left of the row to 255 on the right, there are several places along each row where the major bits change from a logic 0 to a logic 1. The most dramatic change is in the center of each row where one pixel has a binary value of 127, which results in the first seven bits being a logic 1, and the adjacent pixel to the right having a binary value of 128, which results in the first seven bits being a logic 0 and the most significant bit being a logic 1.

If the image data is displayed over time in order of decreasing bit magnitude, that is $b7$, $b6$, $b5$, $b4$, $b3$, $b2$, $b1$, and $b0$, a viewer scanning from left to right may see an abnormally bright region at the 127 to 128 transition. This abnormal brightness is due to the viewer's eye integrating the last half of a given frame of pixel data 127—during which all bits 6:0 are all on—with the first half of the next frame—during which bit 7 is on for the entire half-frame. The net effect of the integration of the last half of the 127-valued pixel and the first half of the 128-valued pixel is a pixel having an intensity value of 255. The same artifact occurs when the pixel data is moving and the viewer's eye is stationary, and at the lower bit transitions.

When viewed at a normal viewing distance, the PWM contouring artifact created by two adjacent pixels is very difficult, if not impossible, for the typical viewer to detect. In real images, however, the bit transitions often occur in areas having a large number of adjacent pixels with virtually identical image data values. If these large areas of similar pixels have clusters whose intensity values cross a major bit transition, the PWM contouring is much easier to detect.

One method of reducing the PWM contouring artifact uses bit splitting. Bit splitting divides the long periods during which the more significant bits are displayed into two or more shorter bits and distributes them throughout the frame period. For example, an 8-bit system may divide the MSB, having a duration of 128 LSB periods, into four equal periods each requiring 32 LSB periods and distributed throughout the frame period.

Bit splitting techniques eliminate most of the objectionable PWM contouring artifacts. Unfortunately, bit splitting increases the necessary bandwidth of the modulator input since some of the data must be loaded into the system multiple times during a single frame period. Practical bit splitting methods reduce, but do not eliminate, the PWM contouring artifact.

One solution to the PWM contouring problem, called boundary dispersion, dithers the image data for each pixel in or near a region that crosses such a major bit boundary. As described in U.S. patent application Ser. No. 09/088,674, spatial patterns are used to dither pixels above and below the values at which the major bit transitions occur. For example, if a major bit transition occurs at an intensity value of 32, all pixels within a certain distance of a pixel having a value equal to 32, or a value in a range including 32, are dithered. In one embodiment, a +/−2 LSB dither is applied in a checkerboard fashion over a repeating two-frame period. During the first frame, the intensity of alternate pixels is reduced by 2 LSBs while the intensity of the other half of the pixels is increased by 2 LSBs. During a second frame, the dither is reversed. Over the two frame period, each pixel is displayed at the correct average intensity. The size of the dither varies as a function of intensity data values of the pixel and nearby pixels.

Boundary dispersion spreads the region in which the major bit transition occurs over a larger area and moves the actual transition each frame. Unfortunately, boundary dispersion creates spatial noise patterns within any given frame and temporal noise from frame-to-frame. What is needed is a system and method for reducing the PWM contouring artifact as well as other artifacts, that does not induce spatial and temporal noise or other artifacts into the resulting image.

SUMMARY OF THE INVENTION

Objects and advantages will be obvious, and will in part appear hereinafter and will be accomplished by the present invention that provides a method and system for artifact mitigation in PWM displays. One embodiment of the claimed invention provides a method of ameliorating image artifacts in a pulse width modulated display system. The method comprising the steps of receiving a series of input pixel intensity values, converting each pixel intensity value to at least one non-binary bit pattern, and displaying each non-binary bit pattern to form a series of image pixels, wherein at least one of said input pixel intensity values displayed alternately by at least two said non-binary bit patterns. The non-binary bit patterns can be alternated either spatially or temporally, or both spatially and temporally.

According to another embodiment of the disclosed invention, a method of ameliorating image artifacts in a pulse width modulated display system is provided. The method comprises the steps of selecting a non-binary set of bit weights to represent image data, determining a set of bit patterns to represent each allowed image intensity word, at least one of the image intensity words is represented by at least two different bit patterns, receiving a series of input pixel intensity values, converting each pixel intensity value to at least one non-binary bit pattern, displaying each non-binary bit pattern, at least one of the input pixel intensity values displayed alternately by at least two non-binary bit patterns. The non-binary bit patterns can be alternated either spatially or temporally, or both spatially and temporally.

Yet another embodiment of the disclosed invention provides a display system The display system comprising a boundary dispersion processor and a display device. The boundary dispersion processor is operable to convert an input intensity word into an output non-binary intensity word having an intensity value representative of the input intensity word. The boundary dispersion processor varies the output non-binary intensity word over time. The display device receives the output non-binary intensity word and displays the output non-binary intensity word.

BRIEF DESCRIPTION OF THE DRAWINGS

For a more complete understanding of the present invention, and the advantages thereof, reference is now made to the following descriptions taken in conjunction with the accompanying drawings, in which:

FIG. 1A is a plan view of a portion of a pixel array showing a 50/50 checkerboard arrangement of pixels for a first frame period.

FIG. 1B is a plan view of the pixel array of FIG. 1 showing a 50/50 checkerboard arrangement of pixels for a second frame period.

FIG. 2A is a plan view of a portion of a pixel array showing the arrangement of bit patterns and intensity values displayed by the pixels for a first frame.

FIG. 2B is a plan view of a portion of a pixel array showing the arrangement of bit patterns and intensity values displayed by the pixels for a second frame.

FIG. 3 is a plan view of an pixel array used to adaptively trigger one embodiment of the noiseless boundary dispersion technique taught herein.

FIG. 4A is a plan view of a portion of a pixel array similar to the array of FIGS. 1 and 2 showing a 75/25 pattern.

DETAILED DESCRIPTION OF THE PREFERRED EMBODIMENTS

Figures 4B, 5, 6:
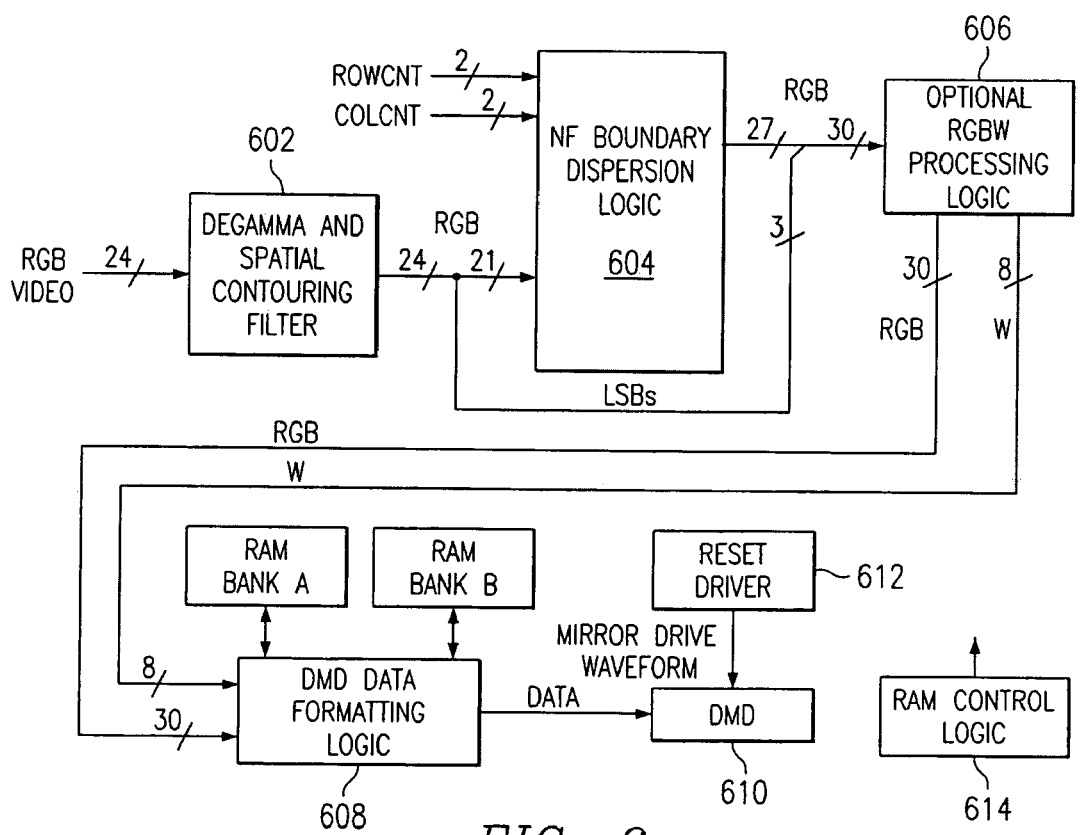
FIG. 4B is a plan view of a portion of a pixel array similar to the array of FIG. 3 showing a 75/25 pattern of pixels for a second frame period.
FIG. 5 is a plan view of the portion of a pixel array from FIG. 4B showing an alternate 75/25 pattern of pixels for the second frame period.
FIG. 6 is a block diagram of a display system for implementing the boundary dispersion techniques described herein.

A new PWM contouring artifact mitigation technique has been developed that mitigates the perceptual artifacts created by PWM display systems without introducing spatial and temporal artifacts of earlier techniques. Earlier techniques dithered the intensity value of a given pixel over time in an attempt to break up or spread the PWM artifact over time and space. The technique taught herein takes advantage of the ability of non-binary bit weighting schemes to produce a given intensity value by two or more sequences.

These sequences are selected and utilized to smooth the transition from one intensity code to the next. Particularly, the sequences are selected to gradually turn on the major bits. The term major bits means the more significant bits of an intensity word that are of the logic state used to illuminate a pixel. For the purposes of this disclosure it will be assumed that a logic "1" illuminates a pixel during a given bit period, whether the illumination is caused by display device generating light at that pixel or by selectively reflecting or transmitting light to the pixel, although the opposite logic convention is intended to be interchangeable. Likewise, terms such as illuminating a pixel are not intended to be exclusive, but rather should be interpreted to include all applicable means of forming an image, whether by using a separate light source and spatial light modulator or by using a display device, such as a field emission device or plasma panel, that is capable of generating lighted image pixels. The terms displaying a bit pattern and displaying a non-binary bit pattern refer to the generation of an image representative of an image word created by using pulse with modulation to illuminate a pixel for a period representative of the bit weight assigned to each bit in the bit pattern and the logic level of that bit in the image word.

The discussion of the various embodiments contained herein will describe a monochromatic display system—that is, one in which there is only one intensity word for each pixel. It should be understood that all of the teachings and claims are applicable to full-color display systems as well. Full color systems merely display pixels created by three separate image intensity words—one for each of the primary colors. Full color display systems create the three primary pixels either simultaneously, in the case of three panel displays, or sequentially as in the case of single panel displays that use color wheels, color filters, separate colored light sources, or other means of generating sequential color beams.

The description of the novel technique described herein makes extensive use of non-binary bit weighting. For the purposes of this disclosure, the term non-binary refers to the use of intensity data words whose bit display periods are not all even powers of two. The use of non-binary bit periods enables the reduction of temporal PWM artifacts through bit splitting while limiting the impact of the bit splitting on system bandwidth requirements. Unlike binary weighted bits, there are many possible non-binary weighting schemes that can produce varying results. The examples of non-binary weighting contained herein are for purposes of illustration and should not be considered limitations to the techniques taught herein or to the claims appended hereto.

Table 1 details an entire sequence of non-binary bit patterns chosen to implement the improved boundary dispersion technique, also referred to as noiseless boundary dispersion. In Table 1, only the even intensity words are listed. This is because when using relatively large input words, such as an eight-bit input word, the boundary dispersion technique provides the advantages sought without having to dither or alter the LSB. Since the LSB is not needed to implement the algorithm, the complexity of the processing hardware is reduced. When reading Table 1, the odd intensity values produce the same output bit words as the preceding even intensity value, but with the LSB set to a logic 1. For example, intensity word 15 is generated using bit weights 1, 4, and 10, while intensity word 21 uses either bit weights 1, 4, 6, and 10, or bit weights 1, 2, and 18. The odd intensity words have the same number and distribution of alternatives as the preceding even intensity words. The choice between alternate patterns and where each of the alternate patterns is used will be discussed in more detail below.

TABLE 1

| Code | Binary 2 | Binary 4 | Non-Binary 6 | Non-Binary 10 | Non-Binary 18 | Non-Binary 32 | Non-Binary 48 | Non-Binary 50 | Non-Binary 84 | Pattern |
|---|---|---|---|---|---|---|---|---|---|---|
| 2 | 1 | | | | | | | | | 100% |
| 4 | | 1 | | | | | | | | 100% |
| 6 | 1 | 1 | | | | | | | | 50% |
| 6 | | | 1 | | | | | | | 50% |
| 8 | 1 | | 1 | | | | | | | 100% |
| 10 | | 1 | 1 | | | | | | | 75% |
| 10 | | | | 1 | | | | | | 75% |
| 12 | 1 | 1 | 1 | | | | | | | 50% |
| 12 | 1 | | | 1 | | | | | | 50% |
| 14 | | 1 | | 1 | | | | | | 100% |
| 16 | 1 | 1 | | 1 | | | | | | 50% |
| 16 | | | 1 | 1 | | | | | | 50% |
| 18 | 1 | | 1 | 1 | | | | | | 75% |
| 18 | | | | | 1 | | | | | 25% |
| 20 | | 1 | 1 | 1 | | | | | | 50% |
| 20 | 1 | | | | 1 | | | | | 50% |
| 22 | 1 | 1 | 1 | 1 | | | | | | 25% |
| 22 | | 1 | | | 1 | | | | | 75% |
| 24 | 1 | 1 | | | 1 | | | | | 50% |
| 24 | | | 1 | | 1 | | | | | 50% |
| 26 | 1 | | 1 | | 1 | | | | | 100% |
| 28 | | 1 | 1 | | 1 | | | | | 50% |
| 28 | | | | 1 | 1 | | | | | 50% |
| 30 | 1 | 1 | 1 | | 1 | | | | | 50% |
| 30 | 1 | | | 1 | 1 | | | | | 50% |
| 32 | | 1 | | 1 | 1 | | | | | 75% |
| 32 | | | | | | 1 | | | | 25% |
| 34 | 1 | 1 | | 1 | 1 | | | | | 75% |
| 34 | 1 | | | | | 1 | | | | 25% |
| 36 | 1 | | 1 | 1 | 1 | | | | | 50% |
| 36 | | 1 | | | | 1 | | | | 50% |
| 38 | | 1 | 1 | 1 | 1 | | | | | 50% |
| 38 | 1 | 1 | | | | 1 | | | | 50% |
| 40 | 1 | 1 | 1 | 1 | 1 | | | | | 25% |
| 40 | 1 | | 1 | | | 1 | | | | 75% |
| 42 | | 1 | 1 | | | 1 | | | | 50% |
| 42 | | | | 1 | | 1 | | | | 50% |
| 44 | 1 | 1 | 1 | | | 1 | | | | 50% |
| 44 | 1 | | | 1 | | 1 | | | | 50% |
| 46 | | 1 | | 1 | | 1 | | | | 100% |
| 48 | 1 | 1 | | 1 | | 1 | | | | 50% |
| 48 | | | 1 | | 1 | 1 | | | | 50% |
| 50 | 1 | | 1 | 1 | | 1 | | | | 75% |
| 50 | | | | | 1 | 1 | | | | 25% |
| 52 | | 1 | 1 | 1 | | 1 | | | | 50% |
| 52 | 1 | | | | 1 | 1 | | | | 50% |
| 54 | 1 | 1 | 1 | 1 | | 1 | | | | 25% |
| 54 | | 1 | | | 1 | 1 | | | | 75% |
| 56 | 1 | 1 | | | 1 | 1 | | | | 50% |
| 56 | | | 1 | | 1 | 1 | | | | 50% |
| 58 | 1 | | 1 | | 1 | 1 | | | | 100% |
| 60 | | 1 | 1 | | 1 | 1 | | | | 50% |
| 60 | | | | 1 | 1 | 1 | | | | 50% |
| 62 | 1 | 1 | 1 | | 1 | 1 | | | | 75% |
| 62 | | 1 | | | 1 | | 1 | | | 25% |
| 64 | | 1 | | 1 | 1 | 1 | | | | 75% |

TABLE 1-continued

| Code | Binary 2 | Binary 4 | Non-Binary 6 | Non-Binary 10 | Non-Binary 18 | Non-Binary 32 | Non-Binary 48 | Non-Binary 50 | Non-Binary 84 | Pattern |
|---|---|---|---|---|---|---|---|---|---|---|
| 64 | 1 | 1 |  | 1 |  |  | 1 |  |  | 25% |
| 66 |  |  | 1 | 1 | 1 | 1 |  |  |  | 50% |
| 66 | 1 |  | 1 | 1 |  |  | 1 |  |  | 50% |
| 68 | 1 |  | 1 | 1 | 1 | 1 |  |  |  | 50% |
| 68 |  | 1 | 1 | 1 |  |  | 1 |  |  | 50% |
| 70 |  | 1 | 1 | 1 | 1 | 1 |  |  |  | 25% |
| 70 | 1 | 1 | 1 | 1 |  |  | 1 |  |  | 75% |
| 72 | 1 | 1 | 1 | 1 | 1 | 1 |  |  |  | 25% |
| 72 |  |  | 1 |  | 1 |  | 1 |  |  | 75% |
| 74 | 1 |  | 1 | 1 |  |  | 1 |  |  | 100% |
| 76 |  | 1 | 1 |  | 1 |  | 1 |  |  | 50% |
| 76 |  |  |  | 1 | 1 |  | 1 |  |  | 50% |
| 78 | 1 | 1 | 1 |  | 1 |  | 1 |  |  | 50% |
| 78 | 1 |  |  | 1 | 1 |  | 1 |  |  | 50% |
| 80 |  | 1 |  | 1 | 1 |  | 1 |  |  | 75% |
| 80 |  |  |  |  |  | 1 | 1 |  |  | 25% |
| 82 | 1 | 1 |  | 1 | 1 |  | 1 |  |  | 75% |
| 82 | 1 |  |  |  |  | 1 | 1 |  |  | 25% |
| 84 | 1 |  | 1 | 1 | 1 |  | 1 |  |  | 50% |
| 84 |  | 1 |  |  |  | 1 | 1 |  |  | 50% |
| 86 |  | 1 | 1 | 1 | 1 |  | 1 |  |  | 50% |
| 86 | 1 | 1 |  |  |  | 1 | 1 |  |  | 50% |
| 88 | 1 | 1 | 1 | 1 | 1 |  | 1 |  |  | 25% |
| 88 | 1 |  | 1 |  |  | 1 | 1 |  |  | 75% |
| 90 |  | 1 | 1 |  |  | 1 | 1 |  |  | 50% |
| 90 |  |  |  | 1 |  | 1 | 1 |  |  | 50% |
| 92 | 1 | 1 | 1 |  |  | 1 | 1 |  |  | 50% |
| 92 | 1 |  |  | 1 |  | 1 | 1 |  |  | 50% |
| 94 |  | 1 |  | 1 |  | 1 | 1 |  |  | 100% |
| 96 | 1 | 1 |  | 1 |  | 1 | 1 |  |  | 50% |
| 96 |  |  | 1 | 1 |  | 1 | 1 |  |  | 50% |
| 98 | 1 |  | 1 | 1 |  | 1 | 1 |  |  | 75% |
| 98 |  |  |  |  | 1 | 1 | 1 |  |  | 25% |
| 100 |  | 1 | 1 | 1 |  | 1 | 1 |  |  | 50% |
| 100 | 1 |  |  |  | 1 | 1 | 1 |  |  | 50% |
| 102 | 1 | 1 | 1 | 1 |  | 1 | 1 |  |  | 25% |
| 102 |  | 1 |  |  | 1 | 1 | 1 |  |  | 75% |
| 104 | 1 | 1 |  |  | 1 | 1 | 1 |  |  | 50% |
| 104 |  | 1 |  | 1 | 1 | 1 | 1 |  |  | 50% |
| 106 | 1 |  | 1 | 1 | 1 | 1 | 1 |  |  | 100% |
| 108 |  | 1 | 1 |  | 1 | 1 | 1 |  |  | 50% |
| 108 |  |  |  | 1 | 1 | 1 | 1 |  |  | 50% |
| 110 | 1 | 1 | 1 |  | 1 | 1 | 1 |  |  | 75% |
| 110 | 1 |  |  | 1 |  |  | 1 | 1 |  | 25% |
| 112 |  | 1 |  | 1 | 1 | 1 | 1 |  |  | 75% |
| 112 |  | 1 |  | 1 |  |  | 1 | 1 |  | 25% |
| 114 | 1 | 1 |  | 1 | 1 | 1 | 1 |  |  | 50% |
| 114 | 1 | 1 |  | 1 |  |  | 1 | 1 |  | 50% |
| 116 | 1 |  | 1 | 1 | 1 | 1 | 1 |  |  | 50% |
| 116 | 1 |  | 1 | 1 |  |  | 1 | 1 |  | 50% |
| 118 |  | 1 | 1 | 1 | 1 | 1 | 1 |  |  | 25% |
| 118 |  | 1 | 1 | 1 |  |  | 1 | 1 |  | 75% |
| 120 | 1 | 1 | 1 | 1 | 1 | 1 | 1 |  |  | 25% |
| 120 | 1 | 1 | 1 | 1 |  |  | 1 | 1 |  | 75% |
| 122 | 1 | 1 |  |  | 1 |  | 1 | 1 |  | 50% |
| 122 |  | 1 |  |  | 1 |  | 1 | 1 |  | 50% |
| 124 | 1 |  | 1 |  | 1 |  | 1 | 1 |  | 100% |
| 126 |  | 1 | 1 |  | 1 |  | 1 | 1 |  | 50% |
| 126 |  |  |  | 1 | 1 |  | 1 | 1 |  | 50% |
| 128 | 1 | 1 | 1 |  | 1 |  | 1 | 1 |  | 50% |
| 128 | 1 |  |  | 1 | 1 |  | 1 | 1 |  | 50% |
| 130 |  | 1 |  | 1 | 1 |  | 1 | 1 |  | 75% |
| 130 |  |  |  |  |  | 1 | 1 | 1 |  | 25% |
| 132 | 1 | 1 |  | 1 | 1 |  | 1 | 1 |  | 75% |
| 132 | 1 |  |  |  |  | 1 | 1 | 1 |  | 25% |
| 134 | 1 |  | 1 | 1 | 1 |  | 1 | 1 |  | 50% |
| 134 |  | 1 |  |  |  | 1 | 1 | 1 |  | 50% |
| 136 |  | 1 | 1 | 1 | 1 |  | 1 | 1 |  | 50% |
| 136 | 1 | 1 |  |  |  | 1 | 1 | 1 |  | 50% |
| 138 | 1 | 1 | 1 | 1 | 1 |  | 1 | 1 |  | 25% |
| 138 | 1 |  | 1 |  |  | 1 | 1 | 1 |  | 75% |
| 140 |  | 1 | 1 |  |  | 1 | 1 | 1 |  | 50% |
| 140 |  |  |  | 1 |  | 1 | 1 | 1 |  | 50% |
| 142 | 1 | 1 | 1 |  |  | 1 | 1 | 1 |  | 50% |
| 142 | 1 |  |  | 1 |  | 1 | 1 | 1 |  | 50% |
| 144 |  | 1 |  | 1 |  | 1 | 1 | 1 |  | 100% |

TABLE 1-continued

| Code | Binary 2 | Binary 4 | Non-Binary 6 | Non-Binary 10 | Non-Binary 18 | Non-Binary 32 | Non-Binary 48 | Non-Binary 50 | Non-Binary 84 | Pattern |
|---|---|---|---|---|---|---|---|---|---|---|
| 146 | 1 | 1 |   | 1 |   | 1 | 1 | 1 |   | 50% |
| 146 |   |   | 1 | 1 |   | 1 | 1 | 1 |   | 50% |
| 148 | 1 |   | 1 | 1 |   | 1 | 1 | 1 |   | 75% |
| 148 |   |   |   |   | 1 | 1 | 1 | 1 |   | 25% |
| 150 |   | 1 | 1 | 1 |   | 1 | 1 | 1 |   | 50% |
| 150 | 1 |   |   |   | 1 | 1 | 1 | 1 |   | 50% |
| 152 | 1 | 1 | 1 | 1 |   | 1 | 1 | 1 |   | 25% |
| 152 |   | 1 |   |   | 1 | 1 | 1 | 1 |   | 75% |
| 154 | 1 | 1 |   |   | 1 | 1 | 1 | 1 |   | 50% |
| 154 |   |   | 1 |   | 1 | 1 | 1 | 1 |   | 50% |
| 156 | 1 |   | 1 |   | 1 | 1 | 1 | 1 |   | 100% |
| 158 |   | 1 | 1 |   | 1 | 1 | 1 | 1 |   | 50% |
| 158 |   |   |   | 1 | 1 | 1 | 1 | 1 |   | 50% |
| 160 | 1 | 1 | 1 |   | 1 | 1 | 1 |   |   | 75% |
| 160 | 1 |   | 1 |   | 1 |   |   | 1 | 1 | 25% |
| 162 |   | 1 |   | 1 | 1 | 1 | 1 |   |   | 75% |
| 162 |   | 1 | 1 |   | 1 |   |   | 1 | 1 | 25% |
| 164 |   | 1 | 1 | 1 |   | 1 | 1 |   |   | 50% |
| 164 | 1 | 1 | 1 |   | 1 |   |   | 1 | 1 | 50% |
| 166 | 1 |   | 1 | 1 | 1 | 1 | 1 |   |   | 50% |
| 166 |   | 1 |   | 1 | 1 |   |   | 1 | 1 | 50% |
| 168 |   | 1 | 1 | 1 |   | 1 | 1 |   |   | 25% |
| 168 | 1 | 1 | 1 | 1 |   |   |   | 1 | 1 | 75% |
| 170 | 1 | 1 | 1 | 1 | 1 | 1 | 1 |   |   | 25% |
| 170 | 1 |   | 1 | 1 | 1 |   |   | 1 | 1 | 75% |
| 172 |   | 1 | 1 | 1 | 1 |   |   | 1 | 1 | 50% |
| 172 | 1 | 1 |   |   |   | 1 |   | 1 | 1 | 50% |
| 174 | 1 | 1 | 1 | 1 | 1 |   |   | 1 | 1 | 25% |
| 174 | 1 |   | 1 |   |   | 1 |   | 1 | 1 | 75% |
| 176 |   | 1 | 1 |   |   | 1 |   | 1 | 1 | 50% |
| 176 |   |   | 1 |   |   | 1 |   | 1 | 1 | 50% |
| 178 | 1 | 1 | 1 |   |   | 1 |   | 1 | 1 | 50% |
| 178 | 1 |   |   | 1 |   | 1 |   | 1 | 1 | 50% |
| 180 |   | 1 |   | 1 |   | 1 |   | 1 | 1 | 100% |
| 182 | 1 | 1 |   | 1 |   | 1 |   | 1 | 1 | 50% |
| 182 |   | 1 | 1 |   |   | 1 |   | 1 | 1 | 50% |
| 184 | 1 |   | 1 | 1 |   | 1 |   | 1 | 1 | 75% |
| 184 |   |   |   |   | 1 | 1 |   | 1 | 1 | 25% |
| 186 |   | 1 | 1 | 1 |   | 1 |   | 1 | 1 | 50% |
| 186 | 1 |   |   |   | 1 | 1 |   | 1 | 1 | 50% |
| 188 | 1 | 1 | 1 | 1 |   | 1 |   | 1 | 1 | 25% |
| 188 |   | 1 |   |   | 1 | 1 |   | 1 | 1 | 75% |
| 190 | 1 | 1 |   |   | 1 | 1 |   | 1 | 1 | 50% |
| 190 |   |   | 1 |   | 1 | 1 |   | 1 | 1 | 50% |
| 192 | 1 |   | 1 |   | 1 | 1 |   | 1 | 1 | 100% |
| 194 |   | 1 | 1 |   | 1 | 1 |   | 1 | 1 | 50% |
| 194 |   |   |   | 1 | 1 | 1 |   | 1 | 1 | 50% |
| 196 | 1 | 1 | 1 |   | 1 | 1 |   | 1 | 1 | 75% |
| 196 |   | 1 |   | 1 |   |   | 1 | 1 | 1 | 25% |
| 198 |   | 1 |   | 1 | 1 | 1 |   | 1 | 1 | 75% |
| 198 | 1 | 1 |   | 1 |   |   | 1 | 1 | 1 | 25% |
| 200 |   |   | 1 | 1 | 1 | 1 |   | 1 | 1 | 50% |
| 200 | 1 |   | 1 | 1 |   |   | 1 | 1 | 1 | 50% |
| 202 | 1 |   | 1 | 1 | 1 | 1 |   | 1 | 1 | 50% |
| 202 |   | 1 | 1 | 1 |   |   | 1 | 1 | 1 | 50% |
| 204 |   | 1 | 1 | 1 | 1 | 1 |   | 1 | 1 | 25% |
| 204 | 1 | 1 | 1 | 1 |   |   | 1 | 1 | 1 | 75% |
| 206 | 1 | 1 | 1 | 1 | 1 | 1 |   | 1 | 1 | 25% |
| 206 |   |   | 1 |   | 1 |   | 1 | 1 | 1 | 75% |
| 208 | 1 |   | 1 |   | 1 |   | 1 | 1 | 1 | 100% |
| 210 |   | 1 | 1 |   | 1 |   | 1 | 1 | 1 | 50% |
| 210 |   |   | 1 | 1 | 1 |   | 1 | 1 | 1 | 50% |
| 212 | 1 | 1 | 1 |   | 1 |   | 1 | 1 | 1 | 50% |
| 212 | 1 |   |   | 1 | 1 |   | 1 | 1 | 1 | 50% |
| 214 |   | 1 |   | 1 | 1 |   | 1 | 1 | 1 | 75% |
| 214 |   |   |   |   | 1 | 1 | 1 | 1 | 1 | 25% |
| 216 | 1 | 1 |   | 1 | 1 |   | 1 | 1 | 1 | 75% |
| 216 | 1 |   |   |   | 1 | 1 | 1 | 1 | 1 | 25% |
| 218 | 1 |   | 1 | 1 | 1 |   | 1 | 1 | 1 | 50% |
| 218 |   | 1 |   |   | 1 | 1 | 1 | 1 | 1 | 50% |
| 220 |   | 1 | 1 | 1 |   |   | 1 | 1 | 1 | 50% |
| 220 | 1 | 1 | 1 |   |   | 1 | 1 | 1 | 1 | 50% |
| 222 | 1 | 1 | 1 | 1 | 1 |   | 1 | 1 | 1 | 25% |
| 222 | 1 |   | 1 |   |   | 1 | 1 | 1 | 1 | 75% |
| 224 |   | 1 | 1 |   |   | 1 | 1 | 1 | 1 | 50% |
| 224 |   |   |   | 1 |   | 1 | 1 | 1 | 1 | 50% |

TABLE 1-continued

| Code | Binary 2 | Binary 4 | Non-Binary 6 | Non-Binary 10 | Non-Binary 18 | Non-Binary 32 | Non-Binary 48 | Non-Binary 50 | Non-Binary 84 | Pattern |
|---|---|---|---|---|---|---|---|---|---|---|
| 226 | 1 | 1 | 1 |   |   | 1 | 1 | 1 | 1 | 50% |
| 226 | 1 |   |   | 1 |   | 1 | 1 | 1 | 1 | 50% |
| 228 |   | 1 |   | 1 |   | 1 | 1 | 1 | 1 | 100% |
| 230 | 1 | 1 |   | 1 |   | 1 | 1 | 1 | 1 | 50% |
| 230 |   |   | 1 | 1 |   | 1 | 1 | 1 | 1 | 50% |
| 232 | 1 |   | 1 | 1 |   | 1 | 1 | 1 | 1 | 75% |
| 232 |   |   |   |   | 1 | 1 | 1 | 1 | 1 | 25% |
| 234 |   | 1 | 1 | 1 |   | 1 | 1 | 1 | 1 | 50% |
| 234 | 1 |   |   |   | 1 | 1 | 1 | 1 | 1 | 50% |
| 236 | 1 | 1 | 1 | 1 |   | 1 | 1 | 1 | 1 | 25% |
| 236 |   | 1 |   |   | 1 | 1 | 1 | 1 | 1 | 75% |
| 238 | 1 | 1 |   |   | 1 | 1 | 1 | 1 | 1 | 50% |
| 238 |   |   | 1 |   | 1 | 1 | 1 | 1 | 1 | 50% |
| 240 | 1 |   | 1 | 1 | 1 | 1 | 1 | 1 | 1 | 100% |
| 242 |   | 1 | 1 | 1 | 1 | 1 | 1 | 1 | 1 | 50% |
| 242 |   |   | 1 | 1 | 1 | 1 | 1 | 1 | 1 | 50% |
| 244 | 1 | 1 | 1 |   | 1 | 1 | 1 | 1 | 1 | 100% |
| 246 |   | 1 |   | 1 | 1 | 1 | 1 | 1 | 1 | 100% |
| 248 | 1 | 1 |   | 1 | 1 | 1 | 1 | 1 | 1 | 100% |
| 250 | 1 |   | 1 | 1 | 1 | 1 | 1 | 1 | 1 | 100% |
| 252 |   | 1 | 1 | 1 | 1 | 1 | 1 | 1 | 1 | 100% |
| 254 | 1 | 1 | 1 | 1 | 1 | 1 | 1 | 1 | 1 | 100% |

A very simple implementation of the boundary dispersion technique uses only two intensity steps to transition a most significant active bit on. One example of a simple implementation uses bit weights of 1, 2, 4, 6, 10, 18, 32, 48, 50, and 84 times the LSB value. In this example, an input intensity word of 34 is displayed using bit weights 2, 4, 10, and 18, and the input intensity word of 36 is displayed using bit weights 4 and 32. Because the display of an intensity of 36 uses bit weight 32, intensity word 35 is used to gradually transition to the use of the most significant active bit. This transition is accomplished by using two of the possible combinations of bit weights to achieve an intensity value of 35. The first pattern, referred to as pattern 'A' for the duration of this example, uses bit weights 1, 2, 4, 10, and 18. The second pattern, referred to as pattern 'B' for the duration of this example, uses bit weights 1, 2, and 32. These two patterns are used in a 50/50 checkerboard pattern shown in FIG. 1A. The pattern is reversed each frame period so that during a second frame the pattern shown in FIG. 1B is used. While the bit weights used are listed by magnitude, the actual order in which they are displayed, and even whether they are displayed as a contiguous bit period or split across two or more bit periods depends on the design of the display system.

FIGS. 2A and 2B show a mixed array of pixel values and patterns. In FIGS. 2A and 2B, intensity value 36 is displayed using bit weights 4 and 32 in each frame period. Likewise, intensity value 34 is displayed using bit weights 2, 4, 10, and 18. The intermediate value, 35, is displayed using an alternating grid of patterns A and B as described above.

One of the major differences between the boundary dispersion techniques taught herein and previous boundary dispersion techniques is that the proper intensity values are always used. Previous techniques dithered the intensity values to create the checkerboard patterns and feather-in the major bits. Maintaining a constant and accurate intensity for all pixels at all times prevents artifacts from being created when the viewer's eye moves, or when the input intensity data changes. Changing pixel intensity from one frame period (3A) to the next (3B), such as the left-most pixel in the middle row and the two left-most pixels in the bottom row, does not result in inaccurate intensity levels for any integration period equal to or longer than a single frame period. Maintaining a constant and accurate intensity for all pixels at all times allows the technique to use only a spatial dither, only a temporal dither, or a combination of spatial and temporal dithering without introducing artifacts in the displayed image.

Although the term frame period will be used throughout this description to describe how often the various alternate patterns are alternated, the term frame period should be interpreted to include any other repeating period—whether sub-frame period, color sub-frame period, or a period of more than one frame. The selection of the term "frame period" merely describes the most general and easily explained period at which to alternate patterns. Likewise, although the description of the boundary dispersion technique uses only two alternate patterns, certain non-binary code sequences permit the use of more than two alternate patterns. The use of more than two alternate patterns is envisioned and does not depart from the teachings and claims hereof.

While the example described above used a strict translation between input intensity value and output bit patterns, more advanced implementations of the boundary dispersion technique vary the bit pattern depending on the values of nearby pixels. FIG. 3 shows but one representative example of a pixel grid used to illustrate the adaptive selection of intensity codes. According to one embodiment, boundary dispersion is used on any pixel N when one of the 24 neighboring pixels shown in FIG. 3 (P1-P24) has a value different than pixel N. This form of adaptive boundary dispersion only uses boundary dispersion when it is needed—that is when nearby pixels have different intensity values and image or eye motion could create artifacts. When a large region of pixels all have the same intensity there is no need for boundary dispersion and the boundary dispersion is turned off to eliminate the possibility of creating artifacts through the boundary dispersion technique itself.

There are numerous strategies for implementing adaptive boundary dispersion. In a very simple case, boundary dispersion is turned on anytime a pixel is within a predetermined distance or intensity value from a boundary at which a major bit is turned on. For example, if a major bit is turned on at intensity value 35, boundary dispersion is applied to pixels with an intensity value of 35 +/−2. Alternatively, boundary dispersion is applied to all pixels with intensities less (greater)

than 35 that are within a predetermined distance from pixels with intensities greater (less) than 35. Yet another alternative applies boundary dispersion to all pixels within a predetermined distance from a pixel having an intensity value of 35.

Yet another implementation of the boundary dispersion further disperses the PWM contouring artifacts. This implementation uses not just a 50/50 checkerboard, but also 25/75 and 75/25 patterns as well. FIGS. 4A and 4B each show an array of pixels having the 75/25 pattern applied. As with FIGS. 2A and 2B, the patterns of FIGS. 4A and 4B are alternated each frame period. The 25/75 pattern is not shown, but is implemented by exchanging the positions of patterns 'A' and 'B' so that 75% of each array is pattern 'B.' The additional patterns are used to gradually spatially phase in the transitions to the higher-ordered bits.

Table 2 shows bit weight data that is used with the checkerboard patterns shown in FIGS. 2A, 2B, 4A, and 4B as the input intensity value increases from a value of 30 to 42. Table 2 contains a portion of the data from Table 1, but in a slightly different format. In Table 2, pattern B uses bit weight 32 for all values above 32, while pattern A does not use bit weight 32 except for input intensity value 42. As indicated by the duty cycle, intensity words 30 and 31 do not use bit weight 32 at all. Once the input intensity word reaches 32, bit weight 32 is used 25% of the time until the input intensity word reaches 36. Once the input intensity word reaches 36, bit weight 32 is used 50% of the time. Input intensity words 40 and 41 resulting bit weight 32 being used 75% of the time, after which it is used 100% of the time for input intensity words 42 and above.

TABLE 2

| Intensity | Pattern "A" | Pattern "B" | Duty Cycle (A/B) |
|---|---|---|---|
| 42 | 4, 6, 32 | 10, 32 | 50/50 |
| 41 | 1, 2, 4, 6, 10, 18 | 1, 2, 6, 32 | 25/75 |
| 40 | 2, 4, 6, 10, 18 | 2, 6, 32 | 25/75 |
| 39 | 1, 4, 6, 10, 18 | 1, 2, 4, 32 | 50/50 |
| 38 | 4, 6, 10, 18 | 2, 4, 32 | 50/50 |
| 37 | 1, 2, 6, 10, 18 | 1, 4, 32 | 50/50 |
| 36 | 2, 6, 10, 18 | 4, 32 | 50/50 |
| 35 | 1, 2, 4, 10, 18 | 1, 2, 32 | 75/25 |
| 34 | 2, 4, 10, 18 | 2, 32 | 75/25 |
| 33 | 1, 4, 10, 18 | 1, 32 | 75/25 |
| 32 | 4, 10, 18 | 32 | 75/25 |
| 31 | 1, 2, 4, 6, 18 | 1, 2, 10, 18 | 50/50 |
| 30 | 2, 4, 6, 18 | 2, 10, 18 | 50/50 |

Returning to Table 1, it is evident that not only is the most major bit, that is the most significant active bit, being smoothly transitioned on, other major bits are also being transitioned to minimize the artifacts created by any of the code transitions. The bit patterns in Table 1 were created to turn each new major bit on over a period, where possible, of twelve intensity codes. The four codes turn the new major bit on only 25% of the time. For example, the codes for intensity values 62-65 only use bit weight 48 25% of the time. The next four codes, for example intensity values 66-69, use bit weight 48 half of the time. The last four codes in the translation, 70-73 use bit weight 48 75% of the time. Code 74 and higher all use bit weight 48 all of the time.

Once a smooth transition to a new major bit is obtained, the alternate non-binary codes are used to obtain smooth transitions on the lesser major bits. For example, codes 80 through 89 implement a smooth transition for bit weight 32 while bit weight 48 is always on.

Often there are not enough alternative non-binary output codes, or enough input intensity words available to use twelve separate input intensity words to effect the transition to a new major bit. When there are insufficient steps available, the 50/50 patterns take precedence over the 25/75 patterns, which take precedence over the 75/25 patterns.

FIG. 6 shows one embodiment of a system of implementing the PWM contouring technique. In FIG. 6, 24 bits of RGB image data, 8 bits per color, is received from a video source. A degamma circuit 602 linearizes the image data, if necessary, to compensate for the response of the display device being used. In the system of FIG. 6, the output of the degamma block is only 8 bits per color—the same as the input. Since the input and output word sizes are the same, a spatial contouring filter is typically included to diffuse the quantization errors that occur, especially for low intensity pixels. The most significant 7 bits of each color of the linearized RGB image data from the spatial contouring filter are input into the boundary dispersion logic 604. As described above, the LSB of each color is not necessary in the embodiment described above in relation to Table 1 and bypasses the boundary dispersion logic 604.

Figure 7:
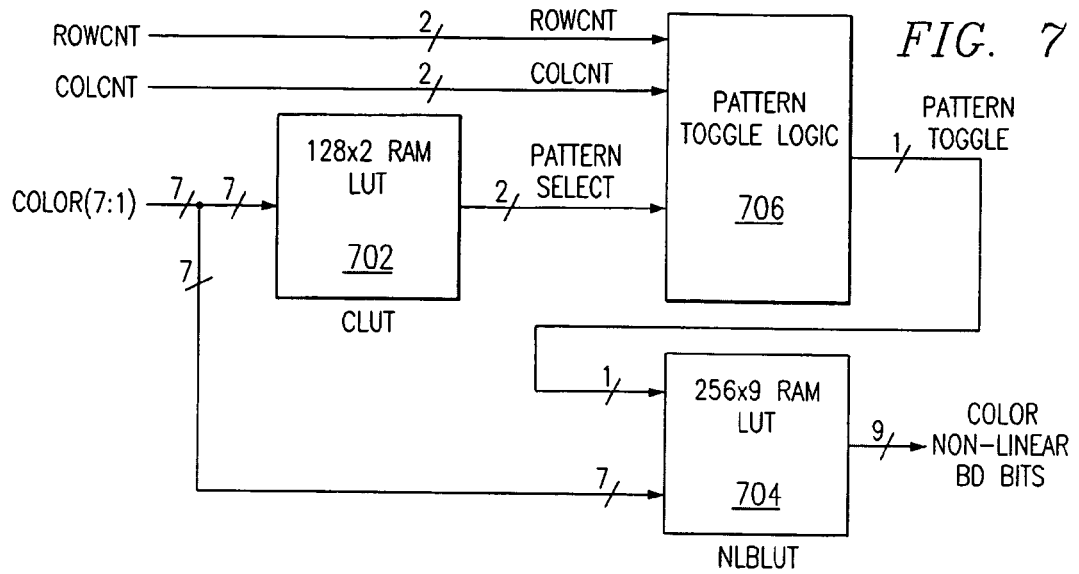
FIG. 7 is a block diagram of the boundary dispersion function shown in FIG. 6.

FIG. 7 is a block diagram of the boundary dispersion logic circuit 604 for one of the color paths in the boundary dispersion logic circuit 604. Sequential color systems only require one color path. In FIG. 7, the single-color image data is received by a color lookup table 702 and used to generate a 2 bit pattern select signal. The row and column information, ROWCNT and COLCNT are used, along with the 2 bit pattern select signal, to create a pattern toggle signal that selects whether the 'A' or 'B' pattern will be produced by the boundary dispersion lookup table 704. The color lookup table 702 is only necessary to enable the use of 75/25 and 25/75 patterns. The ROWCNT and COLCNT signal are toggled each frame period to implement the odd/even frame toggling that switches between the frame 1 and frame 2 patterns. The pattern toggle signal from the pattern toggle logic block 706 is used by the boundary dispersion lookup table 704 to select one of two sets of output data for each possible input data word.

Returning to FIG. 6, the 21 most significant image data bits, which have now expanded to 27 bits, are recombined with the 3 least significant image data bits and input to an optional RGBW processing circuit 606. As described in U.S. Patent Application 60/174,106 and other pending and issued patents, sequential color systems sometimes separate the white component of a video signal from the RGB data and display the white component during a clear color wheel segment or during the spoke periods in which the light filtered by the color wheel changes colors. Although shown after the boundary dispersion logic 604, the optional RGBW processing logic 606 can also be located in front of the boundary dispersion logic 604 in the signal path. The formatted image data, which now consists of ten bits for each of the three primary colors and eight bits for white, is driven to a data formatting logic circuit 608 where it is reformatted for display on a micromirror device 610. Micromirror devices typically receive data in bit planes, or portions thereof, in which a given bit weight for each pixel of a group of pixels is transferred to the micromirror. The reformatter receives data in a bit-parallel pixel-serial format and outputs data to the micromirror device in a bit-serial pixel-parallel format. The reformatting logic alternately uses the two memory banks in ping-pong fashion—writing to one while data is read from the other.

Reset driver 612 provides various voltage waveforms necessary to set and reset the mirrors of the micromirror device 610. Control logic 614 synchronizes the operation of the entire system.

Figure 8:
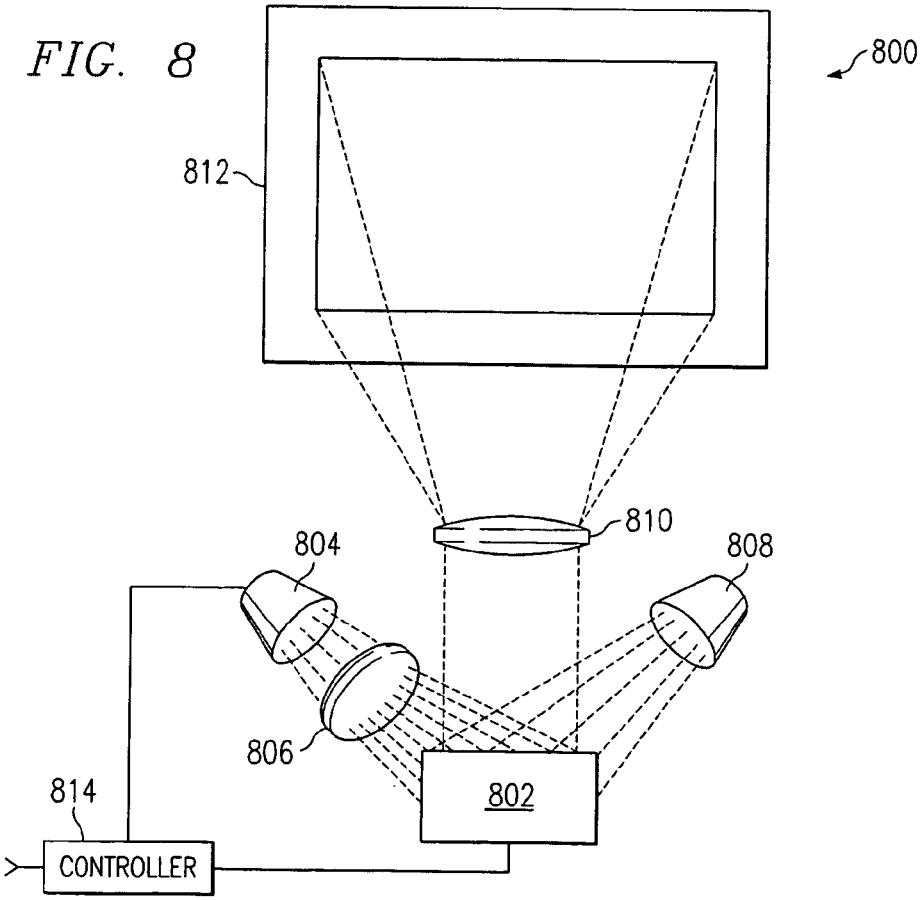
FIG. 8 is a schematic view of a display system incorporating the novel boundary dispersion techniques taught herein.

FIG. 8 is a schematic view of an image projection system 800 using the boundary dispersion techniques described herein. In FIG. 8, light from light source 804 is focused on a micromirror 802 by lens 806. Although shown as a single lens, lens 806 is typically a group of lenses and mirrors which together focus and direct light from the light source 804 onto the surface of the micromirror device 802. Controller 814 performs the boundary dispersion processing and provides image data and control signals to the micromirror 802 to cause some mirrors to rotate to an on position and others to rotate to an off position. Mirrors on the micromirror device that are rotated to an off position reflect light to a light trap 808 while mirrors rotated to an on position reflect light to projection lens 810, which is shown as a single lens for simplicity. Projection lens 810 focuses the light modulated by the micromirror device 802 onto an image plane or screen 812.

Thus, although there has been disclosed to this point a particular embodiment and method for boundary dispersion that reduces PWM contouring artifacts, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A method of ameliorating image artifacts in a display system, the method comprising the steps of:
   providing a set of multiple-bit bit patterns to represent each allowed image intensity word;
   receiving a series of input pixel intensity values;
   converting each said pixel intensity value to at least one of said multiple-bit bit patterns;
   converting selected ones of said pixel intensity values to at least two different of said multiple-bit bit patterns;
   wherein a first bit pattern for a given pixel intensity value in said at least two different of said multiple-bit bit patterns comprises a first plurality of bits, wherein a value of each bit of said first plurality of bits is for indicating a respective active bit period for displaying light for a respective bit period duration and said respective bit period duration differs in duration from any other bit period duration corresponding to any other bit of said first plurality of bits;
   wherein a second bit pattern for said given pixel intensity value in said at least two different of said multiple-bit bit patterns comprises a second plurality of bits, wherein a value of each bit of said second plurality of bits is for indicating a respective active bit period for displaying light for a respective bit period duration and said respective bit period duration differs in duration from any other bit period duration corresponding to any other bit of said second plurality of bits; and
   wherein at least one respective bit period duration corresponding to said first bit pattern differs from all respective bit period durations corresponding to said second bit pattern; and
   displaying light in response to selected ones of said multiple-bit bit patterns, comprising:
   displaying light for said respective bit periods of said first bit pattern for said given pixel intensity value; and
   displaying light for said respective bit periods of said second bit pattern for said given pixel intensity value.

2. The method of claim 1, wherein whether a given said input pixel intensity value is formed by the alternate display of at least two said bit patterns is determined by the value of said given input pixel intensity value.

3. The method of claim 1, wherein whether a given said input pixel intensity value is formed by the alternate display of at least two said bit patterns is determined by the value of neighboring input pixel intensity values.

4. The method of claim 1, wherein whether a given said input pixel intensity value is formed by the alternate display of at least two said bit patterns is determined by the value of said given input pixel intensity value relative to neighboring input pixel intensity values.

5. The method of claim 1, wherein whether a given said input pixel intensity value is formed by the alternate display of at least two said bit patterns is determined by the value of said given input pixel intensity value relative to at least one major bit boundary.

6. The method of claim 1, said step of displaying each said bit pattern to form a series of image pixels, at least one of said input pixel intensity values displayed alternately by at least two said bit patterns comprising alternately displaying said two bit patterns with a 50/50 duty cycle.

7. The method of claim 1, said step of displaying each said bit pattern to form a series of image pixels, at least one of said input pixel intensity values displayed alternately by at least two said bit patterns comprising alternately displaying said two bit patterns with a 25/75 duty cycle.

8. The method of claim 1, said step of displaying each said bit pattern to form a series of image pixels, at least one of said input pixel intensity values displayed alternately by at least two said bit patterns comprising alternately displaying said two bit patterns such that the duty cycle of a major bit increases as the input intensity word increases.

9. The method of claim 1, said step of displaying each said bit pattern to form a series of image pixels, at least one of said input pixel intensity values displayed alternately by at least two said bit patterns comprising alternately displaying each said bit pattern for a frame period.

10. The method of claim 1, said step of displaying each said bit pattern to form a series of image pixels, at least one of said input pixel intensity values displayed alternately by at least two said bit patterns comprising alternately displaying each said bit pattern for a color frame period.

11. The method of claim 1, said step of displaying each said bit pattern to form a series of image pixels, at least one of said input pixel intensity values displayed alternately by at least two said bit patterns comprising alternately displaying said two bit patterns with a 75/25 duty cycle.

12. The method of claim 1 wherein at least one bit period duration corresponding to a bit in said first plurality of bits differs in duration by a factor other than a power of 2 from any other bit period duration corresponding to any other bit of said first plurality of bits.

* * * * *